(12) United States Patent
Mitsumoto

(10) Patent No.: US 10,565,469 B2
(45) Date of Patent: Feb. 18, 2020

(54) APPARATUS AND METHOD FOR PROCESSING IMAGES AND STORAGE MEDIUM

(71) Applicant: CANON KABUSHIKI KAISHA, Tokyo (JP)

(72) Inventor: Shinichi Mitsumoto, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 173 days.

(21) Appl. No.: 15/842,466

(22) Filed: Dec. 14, 2017

(65) Prior Publication Data

US 2018/0173995 A1 Jun. 21, 2018

(30) Foreign Application Priority Data

Dec. 20, 2016 (JP) .................. 2016-247182

(51) Int. Cl.
*G06K 9/68* (2006.01)
*G06K 9/62* (2006.01)
*G06T 7/00* (2017.01)
*G06T 11/60* (2006.01)
*G06F 16/438* (2019.01)
*G06K 9/00* (2006.01)
*G06K 9/46* (2006.01)

(52) U.S. Cl.
CPC ....... *G06K 9/6215* (2013.01); *G06F 16/4393* (2019.01); *G06K 9/00677* (2013.01); *G06T 7/0002* (2013.01); *G06T 11/60* (2013.01); *G06K 9/46* (2013.01)

(58) Field of Classification Search
CPC ............ G06T 1/0014; G08B 13/19608; G08B 13/19645; G08B 13/19671; H04N 5/23216

USPC .................. 382/218, 293, 282, 284, 294
See application file for complete search history.

(56) References Cited

U.S. PATENT DOCUMENTS

| | | | |
|---|---|---|---|
| 7,489,833 B2 * | 2/2009 | Nishio | H04N 5/44513 382/282 |
| 8,086,612 B2 | 12/2011 | Matsushita et al. | |
| 9,516,236 B2 * | 12/2016 | Cho | H04N 5/2624 |
| 10,186,123 B2 * | 1/2019 | Kanaujia | G08B 13/19608 |

(Continued)

FOREIGN PATENT DOCUMENTS

| JP | 2007-006129 A | 1/2007 |
|---|---|---|
| JP | 2014-75778 A | 4/2014 |

*Primary Examiner* — Charlotte M Baker
(74) *Attorney, Agent, or Firm* — Canon U.S.A., Inc. IP Division

(57) ABSTRACT

An extracting unit extracts a first sub-image set that satisfies a second condition and a second sub-image set that satisfies a third condition from an image set that satisfies a first condition. A similarity calculating unit calculates a similarity between images in the first sub-image set and a similarity between images in the second sub-image set. A selecting unit selects, as a first output image set, a plurality of images including a first image included in the first sub-image set and a second image included in the second sub-image set and selects, as a second output image set, a plurality of images including a third image included in the first sub-image set, the third image whose similarity to the first image being smaller than a threshold, and a fourth image included in the third sub-image set, the fourth image whose similarity to the second image being smaller than the threshold.

15 Claims, 14 Drawing Sheets

(56) References Cited

U.S. PATENT DOCUMENTS

2007/0268280 A1* 11/2007 Fujita ................. A61B 1/00045
                                                        345/204
2007/0289022 A1* 12/2007 Wittkotter ............. H04L 63/123
                                                         726/27

* cited by examiner

FIG. 3

| IMAGE ID | FILE NAME | SHOOTING DATE AND TIME | RGB AVERAGE VALUE | SCORE |
|---|---|---|---|---|
| I_0001 | IMG_0005.jpg | 2016/5/1 9:32:45 | 0.523, 0.248, 0.932 | 0.532 |
| I_0002 | IMG_0009.jpg | 2016/5/1 9:45:11 | 0.609, 0.347, 0.726 | 0.626 |
| I_0003 | IMG_0011.jpg | 2016/5/1 9:50:32 | 0.537, 0.269, 0.782 | 0.582 |
| ... | ... | ... | ... | ... |
| I_0031 | IMG_0043.jpg | 2016/5/1 10:22:29 | 0.327, 0.834, 0.595 | 0.395 |
| I_0032 | IMG_0045.jpg | 2016/5/1 10:26:16 | 0.739, 0.478, 0.262 | 0.762 |
| I_0033 | IMG_0046.jpg | 2016/5/1 10:28:53 | 0.518, 0.162, 0.509 | 0.509 |
| ... | ... | ... | ... | ... |
| I_0300 | IMG_0415.jpg | 2016/5/1 23:53:36 | 0.126, 0.087, 0.093 | 0.193 |

| SLIDESHOW ID (R) | SELECTED-IMAGE ID LIST | REPRODUCTION TIME |
|---|---|---|
| SS_0001 | I_0018, I_0043, I_0069, I_0102, I_0133, I_0158, I_0207, I_0230, I_0257, I_0282 | 2016/5/22 19:27:59 |
| SS_0002 | I_0001, I_0033, I_0088, I_0095, I_0128, I_0172, I_0188, I_0237, I_0250, I_0286 | 2016/5/22 19:32:15 |
| SS_0003 | I_0014, I_0050, I_0066, I_0094, I_0141, I_0156, I_0193, I_0213, I_0262, I_0292 | 0/0/0 0:0:0 |
| ... | ... | ... |
| SS_0010 | I_0012, I_0041, I_0076, I_0120, I_0124, I_0160, I_0195, I_0233, I_0254, I_0280 | 0/0/0 0:0:0 |

501

APPARATUS AND METHOD FOR PROCESSING IMAGES AND STORAGE MEDIUM

BACKGROUND OF THE INVENTION

Field of the Invention

The present disclosure relates to a technique for selecting an output image from a set of images.

Description of the Related Art

With the widespread use of digital cameras and smartphones in recent years, the number of photographed images has remarkably increased, and photo storage products and cloud services for managing a large amount of images have been appearing. Such products and services have a function of reproducing an image set on a date basis or an event basis, such as a wedding ceremony or travel, in a slideshow format, as a function for outputting images. Since the slideshow presents images for several seconds per image, it may take much time to present all images in an image set containing many images, so that the user may select a display image from the image set. An example method for selecting a display image is a method of dividing an image set into a plurality of groups and automatically selecting an image with a high evaluation value on the basis of evaluation values obtained by analyzing the images of each group (Japanese Patent Laid-Open No. 2014-75778).

However, when creating a slideshow in units of events that satisfy a predetermined condition, if the user selects images by the method disclosed in Japanese Patent Laid-Open No. 2014-75778, only one slideshow can be created from an image set corresponding to one event. In other words, the user can reproduce only a few slideshows, so that the user may lose interest with the slideshow. To enjoy a plurality of slideshows without the user losing interest, it is recommended to create a plurality of slideshows with different impressions even if there are only a small number of event images.

SUMMARY OF THE INVENTION

The present disclosure provides a technique for selecting a plurality of output image set with different impressions.

An image processing apparatus according to an aspect of the present disclosure includes an extracting unit, a similarity calculating unit, and a selecting unit. The extracting unit is configured to extract a first sub-image set that satisfies a second condition and a second sub-image set that satisfies a third condition from an image set that satisfies a first condition. The similarity calculating unit is configured to calculate a similarity between images in the first sub-image set and a similarity between images in the second sub-image set. The selecting unit is configured to select, as a first output image set, a plurality of images including a first image included in the first sub-image set and a second image included in the second sub-image set and to select, as a second output image set, a plurality of images including a third image included in the first sub-image set, the third image whose similarity to the first image being smaller than a threshold, and a fourth image included in the third sub-image set, the fourth image whose similarity to the second image being smaller than the threshold.

Further features of the present invention will become apparent from the following description of exemplary embodiments with reference to the attached drawings.

BRIEF DESCRIPTION OF THE DRAWINGS

FIG. 3 is a diagram illustrating an image management table.

FIG. 5 is a diagram illustrating a slideshow management table.

DESCRIPTION OF THE EMBODIMENTS

Embodiments of the present disclosure are described hereinbelow with reference to the accompanying drawings. It is to be understood that the configurations described in the following embodiments are mere examples, and the present disclosure is not limited to the configurations described in the embodiments.

First Embodiment

Figure 1:
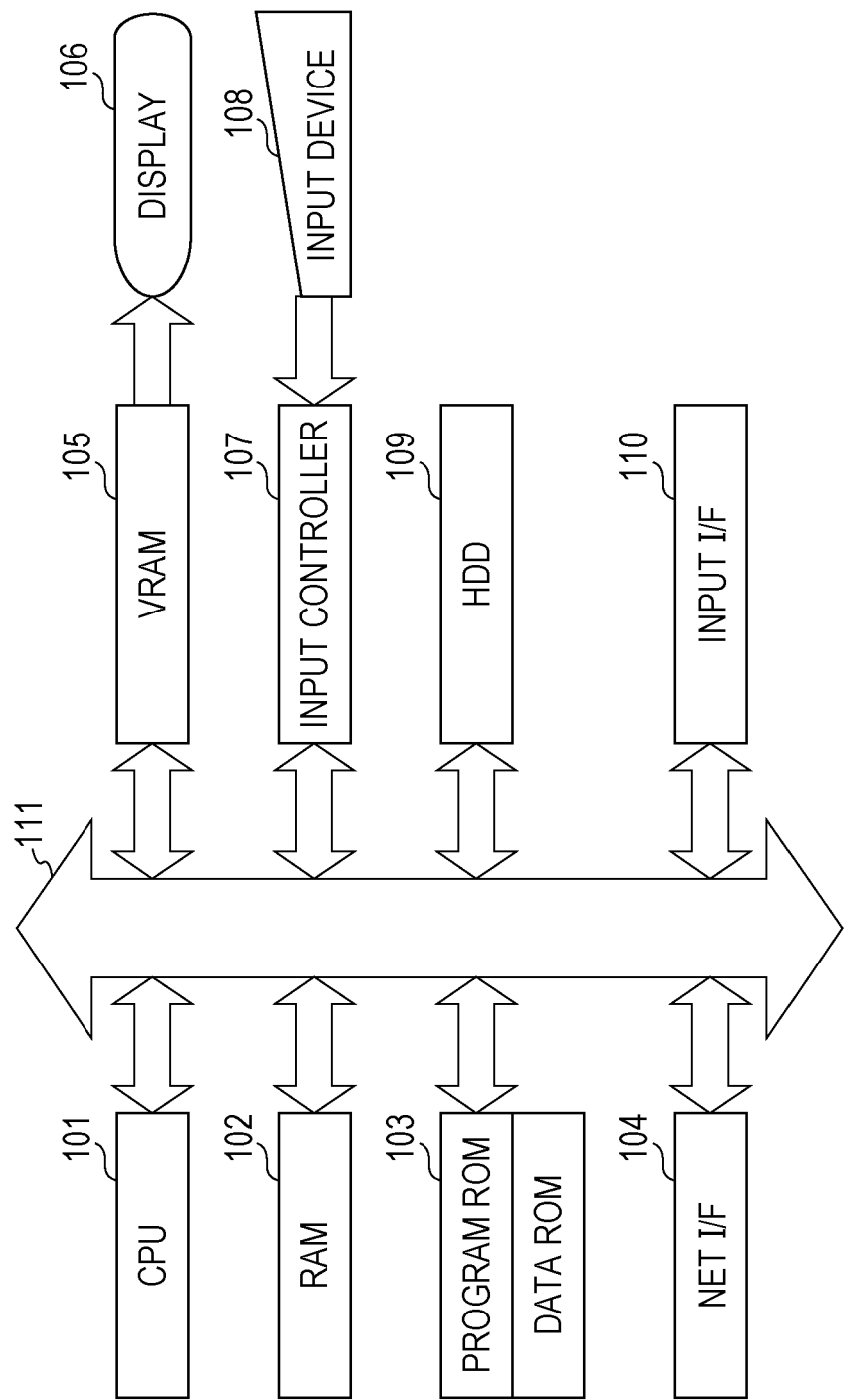
FIG. 1 is a block diagram illustrating the hardware configuration of a slideshow creating apparatus (an image processing apparatus) according to an embodiment of the present disclosure.

Referring first to FIG. 1, an example of the hardware configuration of an image processing apparatus according to the present embodiment will be described.

A central processing unit (CPU) 101 is used to control the computer system. The CPU 101 executes calculation and processing of information and control of the hardware on the basis of control programs to implement various functional configurations and processes.

A random access memory (RAM) 102 functions as the main memory of the CPU 101 and a work memory necessary for loading execution programs and executing the programs. A read only memory (ROM) 103 is a memory for storing a control program for defining an operation processing procedure for the CPU 101. The ROM 103 includes a program ROM that stores basic software (operating system [OS]) which is a system program for controlling the computer system and a data ROM that stores information necessary for operating the system. Instead of the ROM 103, a hard disk drive (HDD) 109 may be used.

A network interface (NET I/F) 104 is used to control input and output of data including image data transmitted and received over a network (not shown). A video RAM (VRAM) 105 is used to expand images displayed on the screen of a display 106.

Examples of the display 106 include a liquid-crystal display and a liquid-crystal television (TV).

An input controller 107 is used to control input signals from an input device 108.

The input device 108 is an external input device for receiving operation instructions from the user, for example, a touch panel, a keyboard, a mouse, and a remote controller. The HDD 109 is a storage unit. The HDD 109 is used to store data, such as application programs and images.

An input interface (IF) 110 is an interface for connecting to an external device, such as a compact disc (CD) or a digital versatile disc (DVD)-ROM drive or a memory card drive, and is used to read image data acquired by, for example, a digital camera. An input/output bus 111 is used to connect the above-described units together. Examples include an address bus, a data bus, and a control bus.

Figure 2:
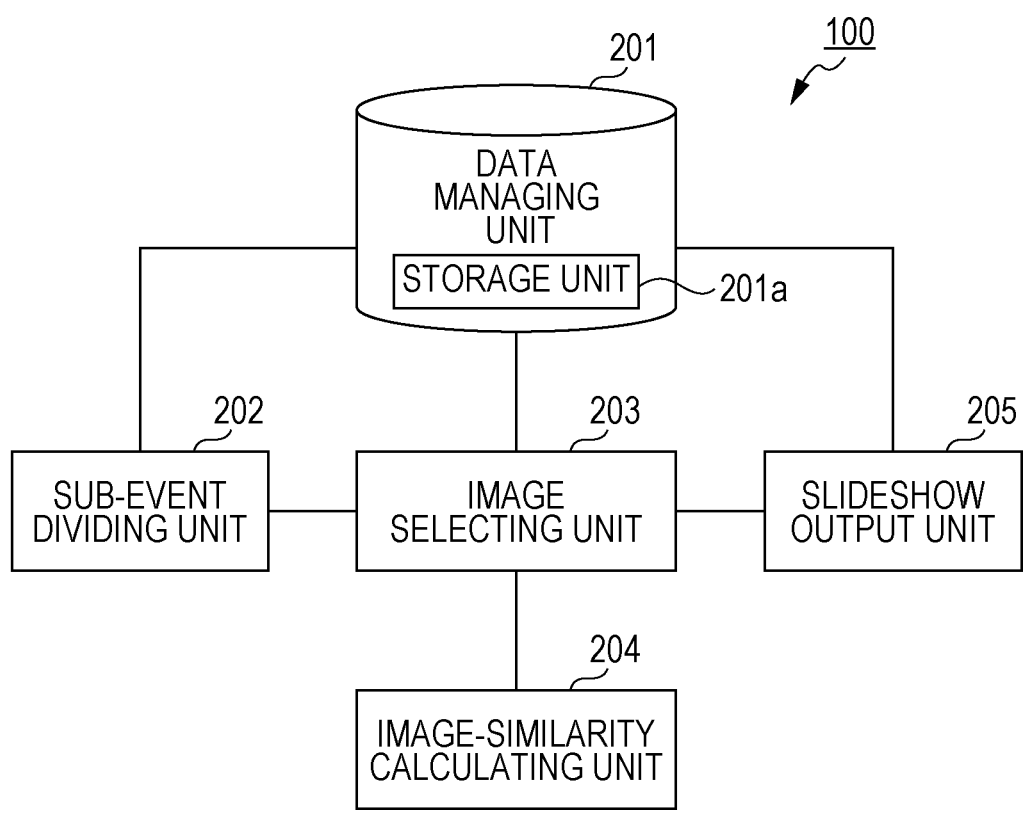
FIG. 2 is a block diagram illustrating the functional configuration of the slideshow creating apparatus.

Referring next to FIG. 2, the functional configuration of a slideshow creating apparatus 100, which is the image processing apparatus according to the present embodiment, will be described. The functions illustrated in FIG. 2 can be implemented by, for example, the hardware illustrated in FIG. 1. In the present embodiment, content to be created is a slideshow, but any content related to images, such as a photobook, may be created. Data to use for content includes not only images, such as pictures and still images, but also moving-image data. In other words, any images for an output image set may be selected.

A data managing unit 201 manages images stored in the HDD 109 and selection images in creating a slideshow. The data managing unit 201 can be implemented by a storage unit 201a, such as the HDD 109, and the CPU 101 that executes a program for managing the data managing unit 201. The storage unit 201a in the data managing unit 201 may be provided outside the slideshow creating apparatus 100. For example, the slideshow creating apparatus 100 may be configured to access the external storage unit 201a via a network.

Figure 4:
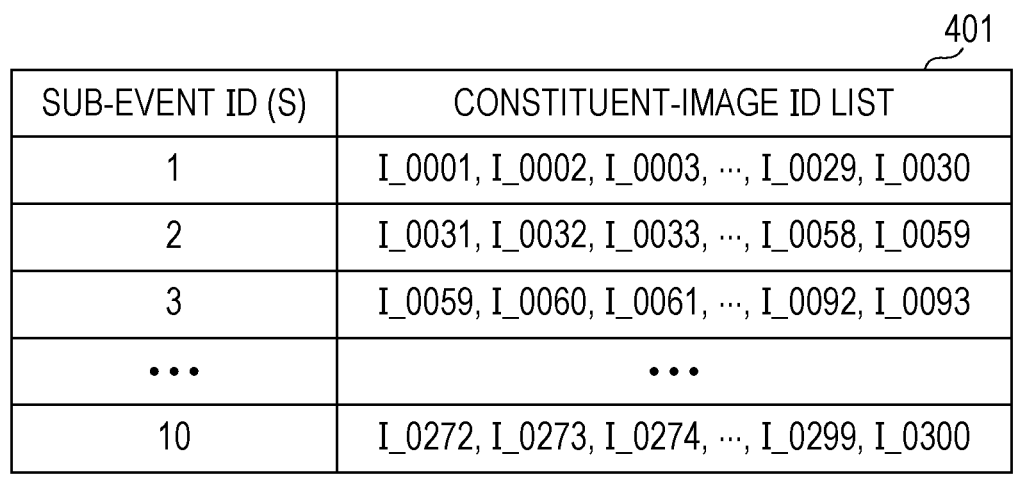
FIG. 4 is a diagram illustrating a sub-event table.

The details of the operation of the data managing unit 201 will be described with reference to FIGS. 3 to 5. Three tables illustrated in FIGS. 3 to 5 are created for each event image set corresponding to each event. The information presented in the three tables illustrated in FIGS. 3 to 5 is stored in a storage device, such as the HDD 109.

Examples of the event are a wedding ceremony, travel, and a sports festival. The data managing unit 201 manages images stored in the HDD 109 for each event. For example, the data managing unit 201 determines a gap between images taken at a predetermined interval (for example, one day) as a gap between events. In other words, the data managing unit 201 manages an image set taken before a predetermined interval (for example, one day) and an image set taken after the predetermined interval as different events. As an alternative, the data managing unit 201 may manage events for each folder that the user stores. In other words, images stored in the same folder may be managed as images corresponding to the same event. As a further alternative, the data managing unit 201 may determine the gap between events (the boundary between an event and an event) from the distribution of shooting dates and times of the images using an algorithm, such as K-means.

As a still further alternative, the data managing unit 201 may determine whether metadata attached to images by the user are the same. Assume that an image set to which metadata "travel" is attached is an event image set, of which an image set to which metadata "domestic travel" is attached may be set as a first sub-image set, and an image set to which metadata "overseas travel" is attached may be set as a second sub-image set. Thus, an image set corresponding to the same event is a set of images that satisfy a predetermined condition for a shooting time, a folder, metadata or the like.

A sub-event dividing unit (extracting unit) 202 divides each of event image sets managed by the data managing unit 201 into a predetermined number of sub-events. In other words, the sub-event dividing unit 202 extracts a sub-image set corresponding to a sub-event from each event image set managed by the data managing unit 201.

An image-similarity calculating unit (similarity calculating unit) 204 calculates the similarity of a designated image pair using the features of the images. For example, the image-similarity calculating unit 204 calculates the similarity between images contained in an image set corresponding to the sub-event. Hereinafter, the term "calculation" also includes derivation of a calculation result using a look-up table.

An image selecting unit (selecting unit) 203 selects a predetermined number of images that are not similar to one another using the similarity between the images calculated by the image-similarity calculating unit 204. The selected images are added to a slideshow management table 501. For example, the image selecting unit 203 selects images so that the similarity between the images is lower than a predetermined similarity (threshold). Thus, the similarity between the images contained in the image set (second image set) selected by the image selecting unit 203 is lower than the predetermined similarity (threshold).

A slideshow output unit 205 displays a slideshow including images listed in the slideshow management table 501 on the display 106.

An image management table 301 in FIG. 3 is a table in which images are managed for each event image set and includes image IDs, image file names, shooting dates and times, RGB average values, and scores. In other words, if three event image sets are present, three image management tables 301 are created by the data managing unit 201.

The RGB average value indicates an average value calculated for each of R, G, and B components of all the pixels in the image. The average value is normalized between 0 and 1.

The score is a value obtained by analyzing the image to evaluate the image quality, which is normalized between 0 to 1, in which 0 indicates low quality, and 1 indicates high quality. The score is determined by evaluating values of the orientation, size, brightness, vividness of color, and the degree of blurring of the detected face, obtained by analyzing the image, as disclosed in Japanese Patent Laid-Open No. 2014-75778. The RGB average values and the scores are calculated, for example, at the timing when the images are stored in the HDD 109.

A sub-event table 401 in FIG. 4 includes sub-event IDs and constituent image ID lists. The sub-event ID is an identifier unique in each event and identifies each of sub-events obtained by dividing an event image set with the sub-event dividing unit 202. In other words, the sub-event ID is an ID with which each sub-event in the event can be identified. In the example illustrated in FIG. 4, images of I_0001 to I_0030 are associated as a sub-image set corresponding to a sub-event 1, and images of I_0031 to I_0058 are associated as a sub-image set corresponding to a sub-event 2.

A slideshow management table 501 in FIG. 5 is a table including slideshow IDs, selected-image ID lists, and reproduction times, in which lists of image IDs selected when the slideshows are created, and the production times are managed. The reproduction time of a slideshow not reproduced is set at an initial value 0. The slideshow ID is an ID with which each slideshow can be identified. In the example illustrated in FIG. 4, images of I_0018, I_0043, . . . , I_0257, I_0282 are associated as images corresponding to a slideshow SS_0001, and images of I_0001, I_0033, . . . , I_0250, I_0286 are associated as images corresponding to a slideshow SS_0002. Image sets in the selected-image ID lists associated with the slideshow IDs are image sets to be output. In the example illustrated in FIG. 5, ten output image sets are selected.

Figure 6:
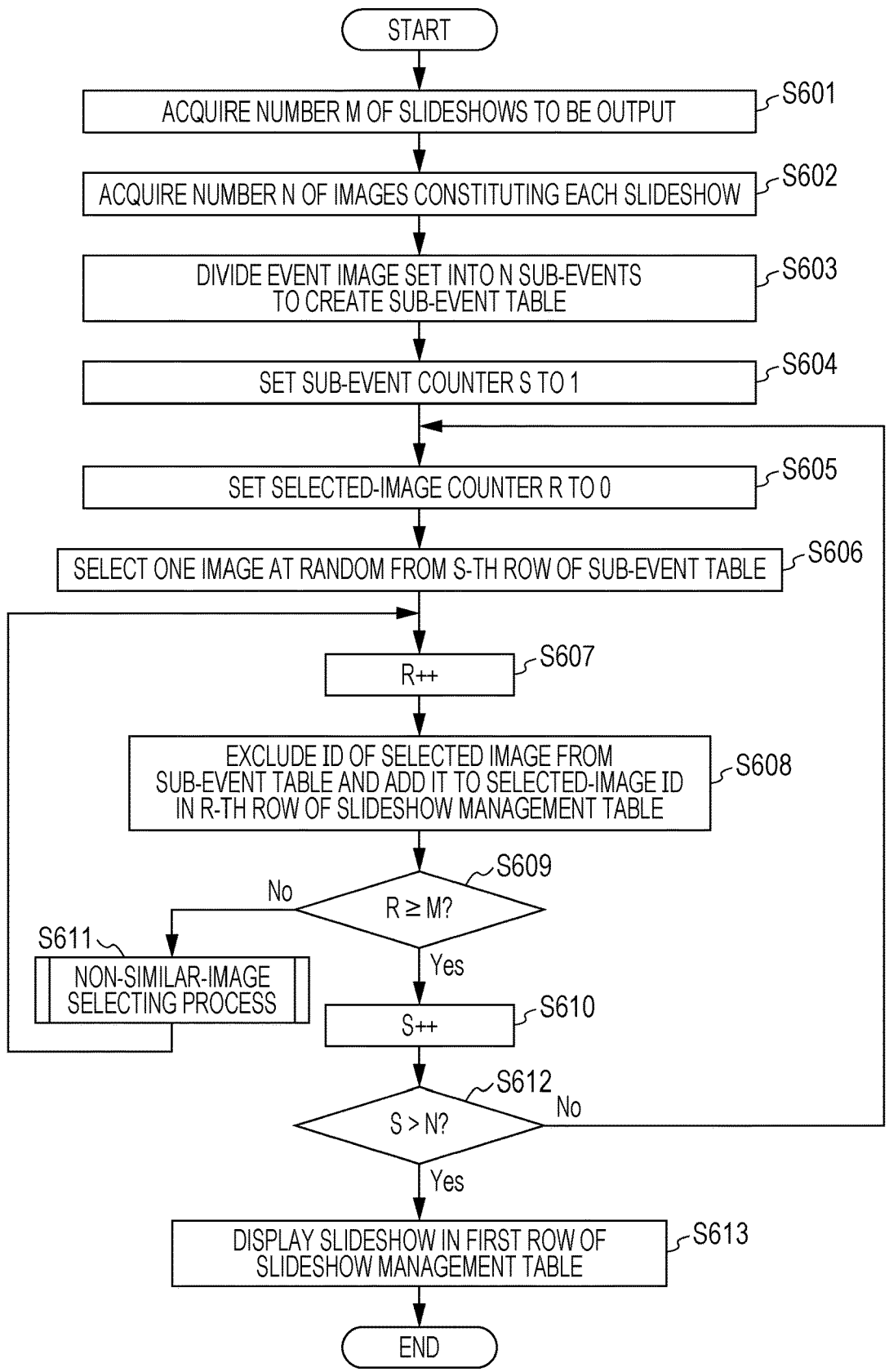
FIG. 6 is a flowchart illustrating an operation of creating slideshows according to an embodiment of the present disclosure.

FIG. 6 is a flowchart illustrating an operation of creating and displaying a plurality of slideshows using an event image set designated from the outside, such as a user.

At S601, the number M of slideshows to be created is acquired from the outside of the slideshow creating apparatus 100. The number M of slideshows is designated, for example, by the user with an operating device, such as a mouse, a keyboard, or a touch panel.

At S602, the number N of images constituting one slideshow is acquired from the outside of the slideshow creating apparatus 100. The number N of images is designated, for example, by the user with an operating device, such as a mouse, a keyboard, or a touch panel.

At S603, the data managing unit 201 extracts the image management table 301 corresponding to the designated event image set from the storage unit 201a.

The sub-event dividing unit 202 divides the image set listed in the image management table 301 into N sub-events, or subsets. The sub-event dividing unit 202 assigns the divided sub-events IDs in order of shooting time to create the sub-event table 401.

The sub-event dividing unit 202 determines the gap between images taken at a predetermined interval (for example, one day) in images included in the event image set as the gap between sub-events. In other words, the sub-event dividing unit 202 determines that an image set taken before a predetermined interval (for example, two hours) and an image set taken after the predetermined interval are different events. The sub-event dividing unit 202 may manage images stored in one subfolder as one sub-event image set. In other words, images stored in the same subfolder may be managed as images corresponding to the same sub-event. The subfolder is a folder at a lower level than the folder in which the event image set is stored. The sub-event dividing unit 202 may determine the gap between sub-events (the boundary between a sub-event and a sub-event) from the distribution of shooting dates and times of the images using an algorithm, such as K-means. Thus, an image set corresponding to the same sub-event is a set of images that satisfy a predetermined condition for a shooting time, a folder, or the like of images of the same event image set.

At S604, the image selecting unit 203 sets a sub-event counter S for processing by sub-event and initializes S to 1.

At S605, the image selecting unit 203 sets a selected-image counter R for use in selecting an image for each sub-event and initializes R to 0.

At S606, the image selecting unit 203 selects one of images in a row with a sub-event ID of S in the sub-event table 401 at random.

At S607, the image selecting unit 203 increases the selected-image counter R by one.

At S608, the image selecting unit 203 excludes the image ID of the image selected at S606 or S611 (described later) from the sub-event table 401 and adds the image ID to a selected-image ID list in the R-th row of the slideshow management table 501.

At S609, the image selecting unit 203 determines whether the selected-image counter R indicates M or more, and if it is M or more (Yes at S609), the process goes to S610, and if it is less than M (No at S609), the process goes to S611.

At S610, the image selecting unit 203 increases the sub-event counter S by one.

Step S611 is a process for selecting non-similar images performed by the image selecting unit 203. The details will be described with reference to a flowchart in FIG. 7.

At S612, the image selecting unit 203 determines whether the sub-event counter S exceeds the number N of slideshow constituent images. If S exceeds the number N (Yes at S612), the process goes to S613, and if S does not exceeds the number N (No at S612), then the process goes to S605.

At S613, the slideshow output unit 205 reproduces a slideshow in the first row of the slideshow management table 501 and displays the slide show on the display 106. In other words, the slideshow output unit 205 displays the images in the selected-image ID list on the display (display unit) 106 sequentially at predetermined time intervals. Thus, the slideshow output unit 205 also functions as a display control unit.

This concludes the description of the processing for creating a slideshow using the flowchart in FIG. 6. Thus, M slideshows (image sets to be output) constituted by N images are selected.

Referring next to the processing flowchart, the process for selecting non-similar images (S608) will be described. The process for selecting non-similar images is a process for forming an image set in which the similarity between the images is lower than a predetermined similarity.

At S701, the image selecting unit 203 acquires the S-th image ID of a selected-image ID list in the R-th row of the slideshow management table 501 and stores the image ID as an ID Q. If R is 2 and S is 3, then I_0088 is stored.

At S702, the image selecting unit 203 acquires the RGB average values of an image whose image ID is Q and the RGB average values of each of images of constituent image IDs in the S-th row of the sub-event table 401 from the image management table 301 and calculates the distance between the two images. This distance is a similarity. The distance, for example, the distance between the average values (Ra, Ga, Ba) of an image A and the average values (Rb, Gb, Bb) of an image B can be calculated by $\sqrt{((Rb-Ra)^2+(Gb-Ga)^2+(Bb-Ba)^2)}$.

At S703, the image selecting unit 203 selects an image ID that is farthest from the image Q among distances calculated at S702. If R is 2 and S is 3, the image selecting unit 203 selects an image whose similarity is farthest from the image of I_0088 from among the constituent images of the sub-event ID 3. In that case, an image whose similarity is smaller than a predetermined threshold may be selected. In the example illustrated in FIG. 5, I_0066 is selected and added to SS_0003.

At S703, if a plurality of images have already been selected from the constituent images of the sub-event ID 3, the image selecting unit 203 may select an image whose similarity to any selected images is lower than the predetermined threshold from the image set of the sub-event ID 3.

Figure 7:
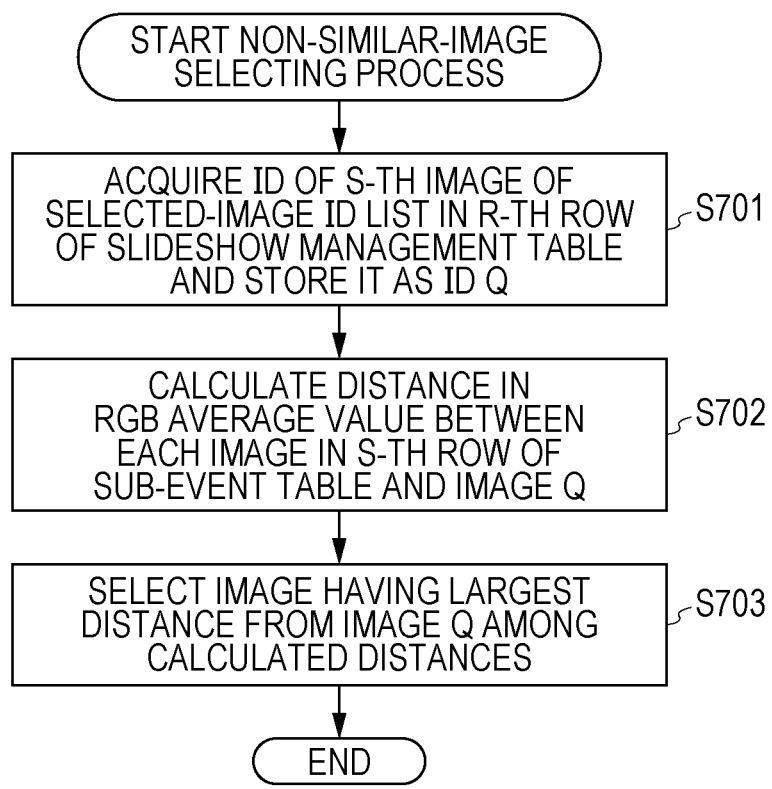
FIG. 7 is a flowchart illustrating an operation for selecting an image according to a first embodiment of the present disclosure.

This concludes the description of the process for selecting non-similar images using the flowchart in FIG. 7.

As described above, according to the present embodiment, M slideshows each constituted by N images can be created for the designated event image set. Selecting non-similar images from each sub-event causes the impressions of the slideshows to differ, allowing the viewer to enjoy the slideshows without being gotten tired. In other words, even for one event, a plurality of slideshows that give different impressions can be created.

Although it is assumed that the number M of slideshows is designated from the outside of the slideshow creating apparatus 100, the number M may be calculated from the total number of images in the event image set and the number N of constituent images of the slideshow. Also the number N of constituent images of the slideshow may be not only a value designated from the outside of the slideshow creating apparatus 100 but also the dividable number of sub-events. If the number of images included in the divided sub-event is smaller than M, repeated selection of images may be permitted. For example, if at S608 the S-th row of the sub-event table is empty, the image IDs in the S-th row, which have already been added from the first to (R−1)th rows of the slideshow management table 501, are copied to the S-th row of the sub-event table 401, and the process at S608 is executed.

Although at S606 the first image is selected at random from each sub-event, this is given for mere illustration. Any other way may be used; for example, an image taken at the first time or an image with the best score may be selected.

Although at S702 the distance from the selected image Q is calculated for all images included in the sub-event, images with lower scores than the predetermined score, that is, low-quality images may be excluded.

Although RGB average values are used as features when a non-similar image is selected at S703, this is given for mere illustration, and another feature may be used. For example, values of hue (H), saturation (S), and lightness value (V), which are obtained by converting RGB color space to HSV color space, or the histogram of luminance or RGB may be calculated, and a hash value may be calculated from the values of density of luminance. The feature for use may not be only one kind of value but also a combination of a plurality of kinds of value. Not only using a plurality of values at a time, but the order of using the values may be changed. The similarity may be calculated not only using the difference in distance in feature space but also using mechanical learning. Any method for calculating similarity may be used. When the data is moving images, the similarity may be calculated by using the feature of the first frame or the average of the features of all frames, or thinning out frames in a predetermined ratio and using the features of remaining frames after the thinned-out.

Second Embodiment

Figure 8:
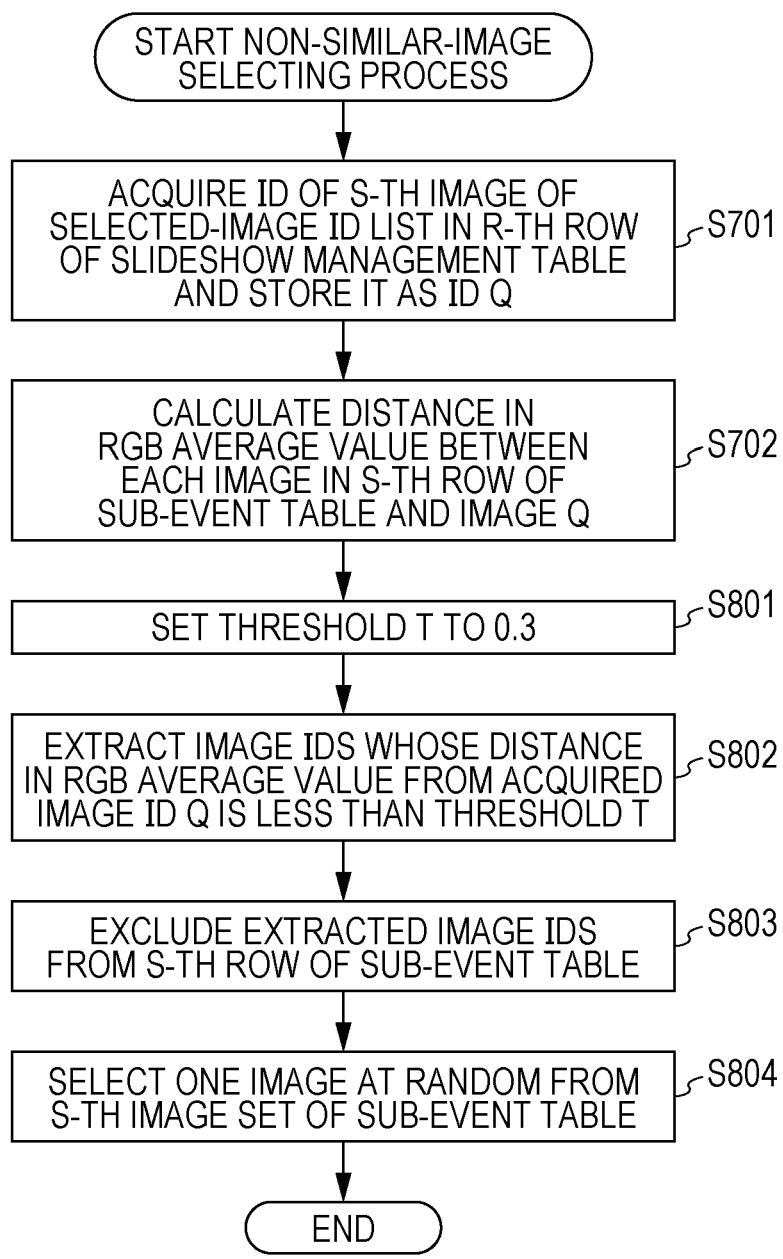
FIG. 8 is a flowchart illustrating an operation for selecting an image according to a second embodiment of the present disclosure.

In the first embodiment, in the process of selecting non-similar images in a sub-event, an image that is not most similar to the image selected immediately before is selected. However, if images that are not most similar are selected in sequence, similar images can be selected. For example, images selected at the second and the third times are not similar to each other, and images selected at the third and fourth times are not similar to each other. However, the images selected at the second and fourth times may not similar to the image selected at the third time, but the images selected at the second and fourth times may be similar to each other. To address the issue, in the second embodiment, images with similarities less than a predetermined threshold in feature space are excluded from a selection target image set, and image are selected from the selection-target image set. Difference from the first embodiment will be described with reference to a flowchart in FIG. 8. The flowchart in FIG. 8 is a replacement of the flowchart in FIG. 7, which is the non-similar image selecting process (S611) in the first embodiment. Descriptions of parts similar to those of the other embodiments are omitted as appropriate.

At S801, the image selecting unit 203 sets a threshold T for use in determining a similarity to 0.3.

At S802, the image selecting unit 203 extracts image IDs whose distance (similarity) calculated at S702 is less than the threshold T.

At S803, the image selecting unit 203 excludes image IDs extracted at S802 from the list of constituent image IDs in the S-th row of the sub-event table 401.

At S804, the image selecting unit 203 selects an image at random from the list of constituent image IDs in the S-th row of the sub-event table 401.

This concludes the description of the process for selecting non-similar images in the second embodiment using FIG. 8.

As described above, in the present embodiment, images whose distance is less than the predetermined threshold, that is, similar images, of images selected in feature space are excluded from selection target, so that non-similar images can be always selected.

Although at S804 images are selected at random from the image set in the S-th row of the sub-event table 401, this is given for mere illustration, and any other method can be employed. For example, either a method of selecting images in order of shooting time or a method of selecting images in descending order of scores may be employed.

When at S807 or S808 there is no image to be excluded or no image to be selected in the relevant row of the sub-event table 401, an image may be added to the sub-event table 401. For example, excluded images may be stored for each sub-event and may be added to the sub-event table 401.

The value of the threshold T set at S801 is not limited to the above value; the threshold T may be set to any value. If the feature to be used differs, the threshold T is changed.

Third Embodiment

Figure 9:
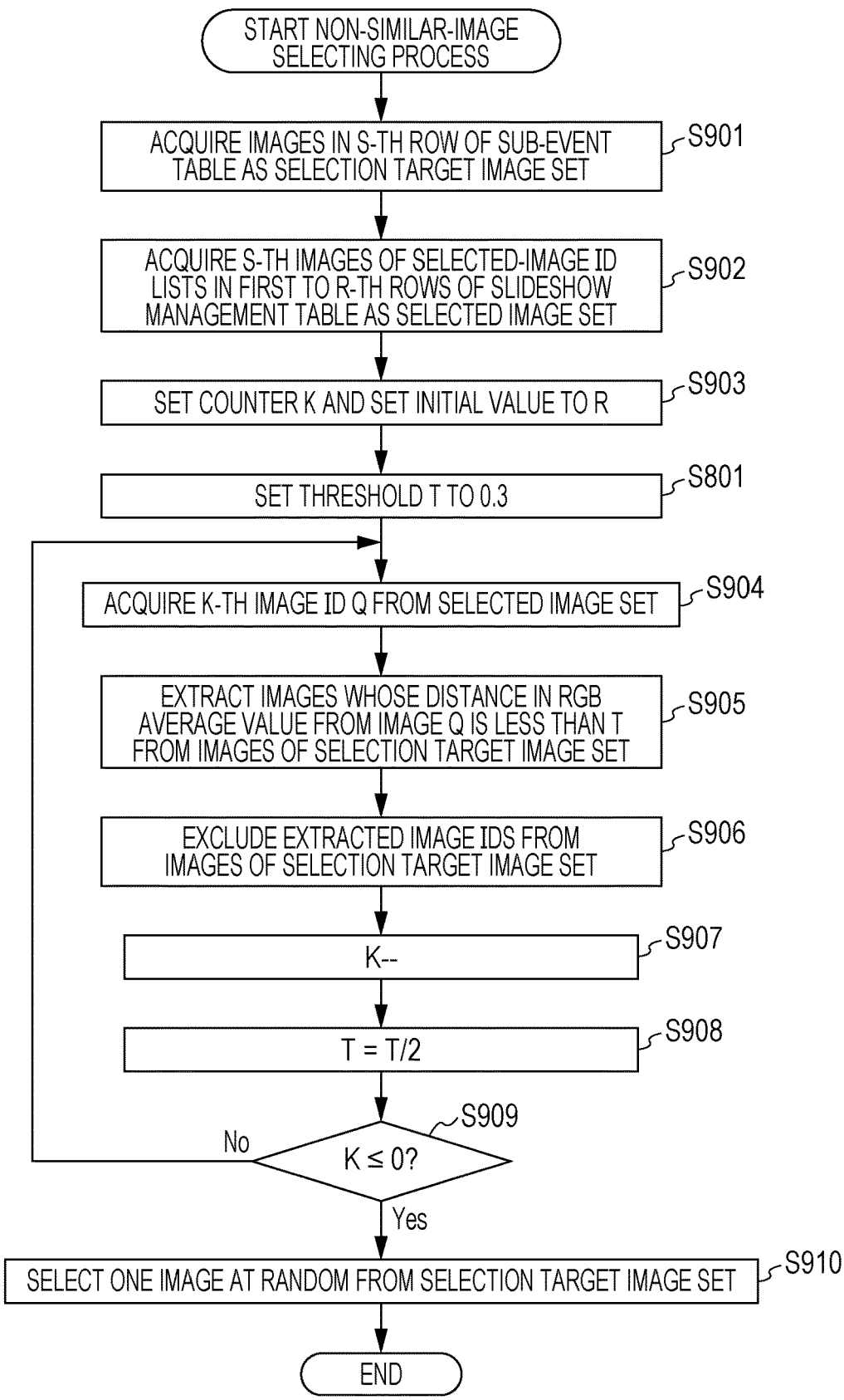
FIG. 9 is a flowchart illustrating an operation for selecting an image according to a third embodiment of the present disclosure.

In the second embodiment of the present disclosure, non-similar images are selected by excluding images whose distance to a selected image in feature space is less than a predetermined threshold from the selection target. However, if images within a predetermined range are excluded from a selection target image set, there is a possibility that, if the number of slideshows to be created is large, no selectable image remains in the selection target image set. Although the method described in the second embodiment can also cope with the lack of selectable images, an image that is determined to be similar immediately before may be selected. To cope with this issue, a third embodiment is intended to prevent selectable images from running out of the selection target image set by performing control to decrease the value of the threshold every time an image is selected. Difference from the second embodiment will be described with reference to a flowchart in FIG. 9. The flowchart in FIG. 9 is a replacement of the flowchart in FIG. 8, which is the non-similar image selecting process (S611) in the second embodiment. Descriptions of parts similar to those of the other embodiments are omitted as appropriate.

At S901, the image selecting unit 203 acquires images included in the list of constituent image IDs in the S-th row of the sub-event table 401 as a selection target image set.

At S902, the image selecting unit 203 acquires S-th images in the selected-image ID lists from the first to R-th rows of the slideshow management table 501 as a selected-image set.

At S903, the image selecting unit 203 sets a counter K for use in the following process and sets the initial value to R.

At S904, the image selecting unit 203 acquires a K-th image Q from the selected-image set.

At S905, the image selecting unit 203 extracts images whose distance in RGB average value from that of the image Q is less than T from the images of the selection target image set.

At S906, the image selecting unit 203 excludes the image set extracted at S905 from the selection target image set.

At S907, the image selecting unit 203 decreases the counter K by one.

At S908, the image selecting unit 203 halves the value of the threshold T.

At S909, the image selecting unit 203 determines whether the counter K is 0 or less, and if the counter K is 0 (Yes at S909), the process goes to S910, and if the counter K is not 0 (No at S909), the process goes to S904.

At S910, the image selecting unit 203 selects one image at random from the selection target image set.

This concludes the description of the process for selecting non-similar images in the third embodiment using FIG. 9.

The present embodiment prevents selectable images from running out by decreasing the threshold for use in determining similarity to an image whose selection order is old as the number of creation times of slideshows increases. This can cause, if the creation order and the viewing order of the slideshows are the same, images used in the slideshow created at the first time and images used in the slideshow created last may similar to each other. However, the similarity to the last image is low, resulting in different impressions.

The method for decreasing the threshold T at S907 may be another method. The threshold T may be decreased as the number of selection times increases. The method of decrease may be based on a rule, such as proportion, or may not be based on a rule.

Fourth Embodiment

In the first to third embodiments, a plurality of slideshows are created at a time. However, if all the slideshows have been viewed, it is necessary to create an additional slideshow. To cope with this issue, the present embodiment creates an additional slideshow in a situation where P slideshows created by the method of the first to third embodiments have been reproduced. The flowchart in FIG. 6, which is the flowchart in FIG. 6 of the first embodiment is replaced with a flowchart in FIG. 10, and the flowchart (S611) in the third embodiment is replaced with a flowchart in FIG. 12 (S1004). Difference from the third embodiment will be described hereinbelow.

A process for creating additional M slideshows each constituted by N images will be described with reference to the flowchart in FIG. 10. The number N of constituent images may be designated from the outside of the slideshow creating apparatus 100 as at S602 or may be calculated from the number of constituent image IDs of each slideshow in the slideshow management table 501.

At S1001, the image selecting unit 203 acquires the number P of created slideshows and information on the last slideshow reproduction time from the slideshow management table 501.

Step S1002 is a process for setting a threshold T1st for use in the first image selection performed by the image selecting unit 203 in creating an additional slideshow. The details of the process will be described with reference to a flowchart in FIG. 11.

At S1003, the image selecting unit 203 initializes the selected-image counter R to P.

Step S1004 corresponds to S611 in the first to third embodiments, at which the image selecting unit 203 selects non-similar images. The details of the process will be described with reference to the flowchart in FIG. 12.

At S1005, the image selecting unit 203 determines whether the counter K indicates (M+P), in which the counter K is (M+P) or more (Yes at S1005), the process goes to S610, and if the counter K indicates less than (M+P) (No at S1005), the process goes to S1004.

At S1006, the image selecting unit 203 displays a slideshow in the (P+1)th row of the slideshow management table 501.

Figure 10:
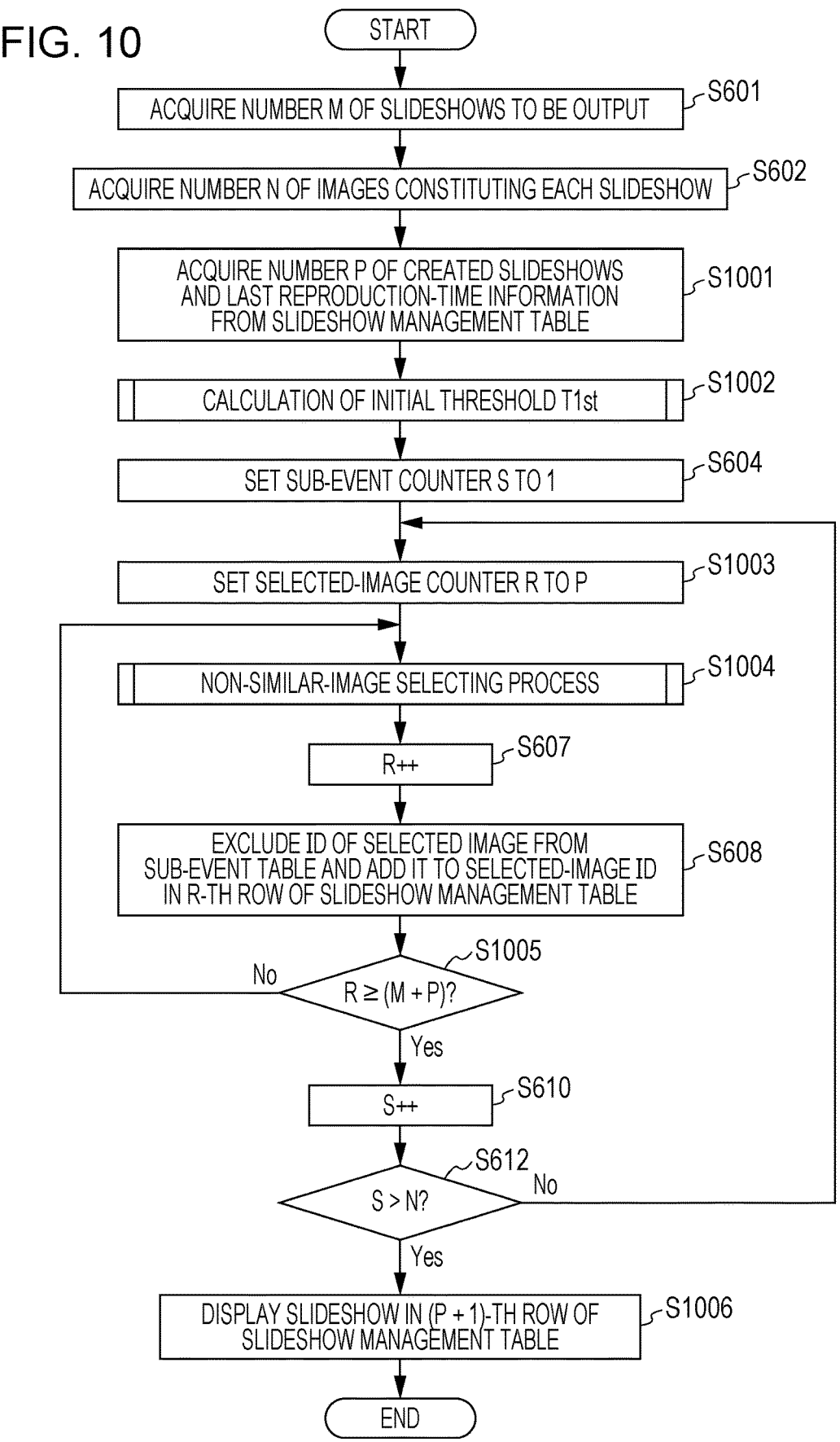
FIG. 10 is a flowchart illustrating an operation for creating a slideshow according to a fourth embodiment of the present disclosure.

This concludes the process of creating an additional slideshow using the flowchart in FIG. 10.

Figure 11:
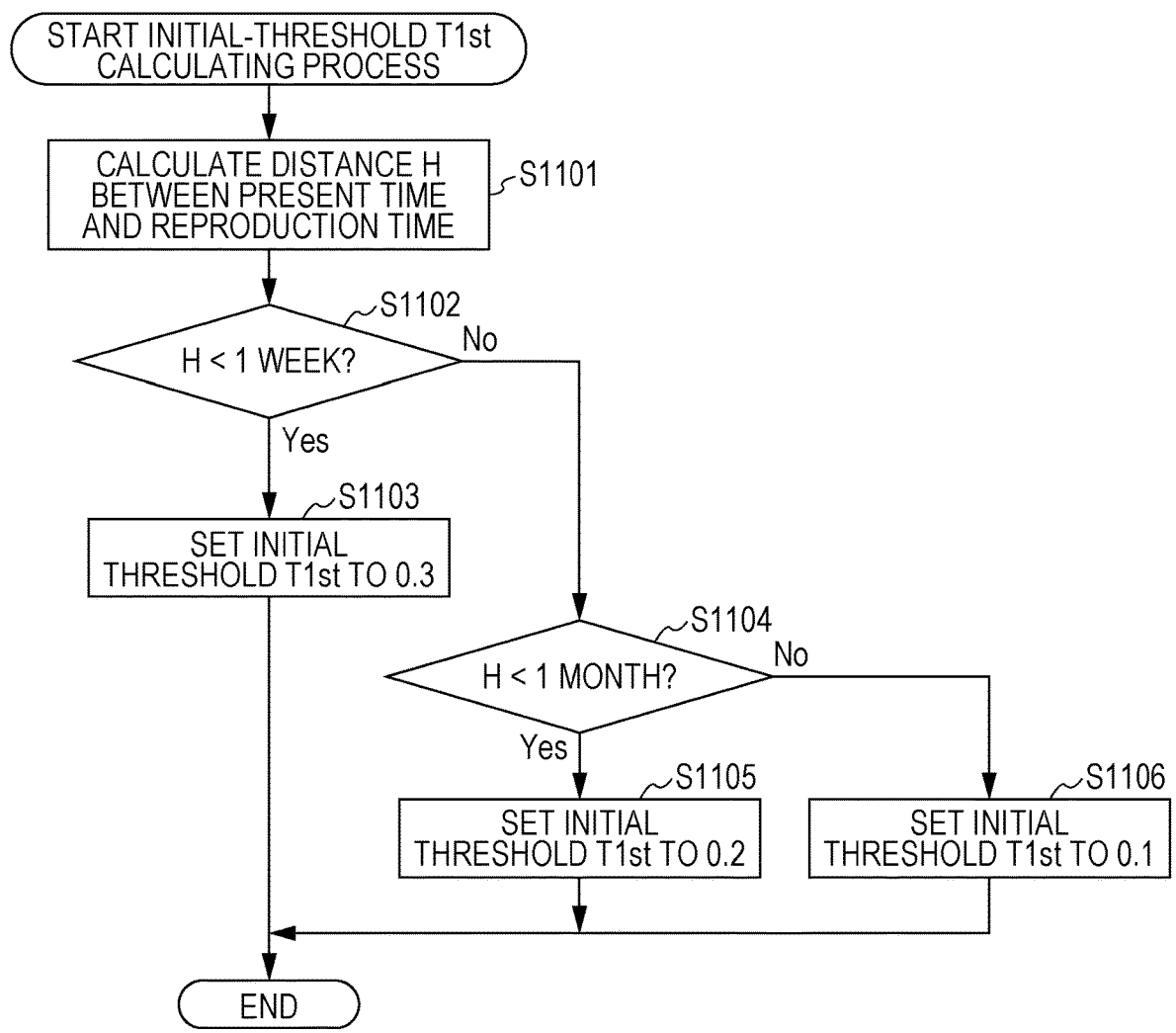
FIG. 11 is a flowchart illustrating an operation for setting an initial threshold according to the fourth embodiment.

Referring next to the flowchart in FIG. 11 which the process at S1002, the process of setting the threshold T1st at the first image selection in creating an additional slideshow. At S1101, the image selecting unit 203 calculates the time difference H between the present time and the reproduction time acquired at S1001.

At S1102, the image selecting unit 203 determines whether the time difference H is less than one week, and if the time difference H is less than one week (Yes at S1102), the process goes to S1103, and if the time difference H exceeds one week (No at S1102), the process goes to S1104.

At S1103, the image selecting unit 203 sets the initial threshold T1st to 0.3.

At S1104, the image selecting unit 203 determines whether the time difference H is less than one month, and if the time difference H is less than one month (Yes at S1104), the process goes to S1105, and if the time difference H exceeds one month (No at S1104), the process goes to S1106.

At S1105, the image selecting unit 203 sets the initial threshold T1st to 0.2.

At S1106, the image selecting unit 203 sets the initial threshold T1st to 0.1.

This concludes the process of setting the initial threshold T1st using the flowchart in FIG. 11.

Referring next to the flowchart in FIG. 12, the process for selecting non-similar images will be described.

At S1201, the image selecting unit 203 determines whether the counter K indicates the same number as the number P of created slideshows, and if the counter K and the number P are the same number (Yes at S1201), the process goes to S1202, and if it is not (No at S1201), the process goes to S1203.

At S1202, the image selecting unit 203 sets the threshold T to T1st acquired at S1003.

At S1203, the image selecting unit 203 sets the threshold T to 0.3.

Figure 12:
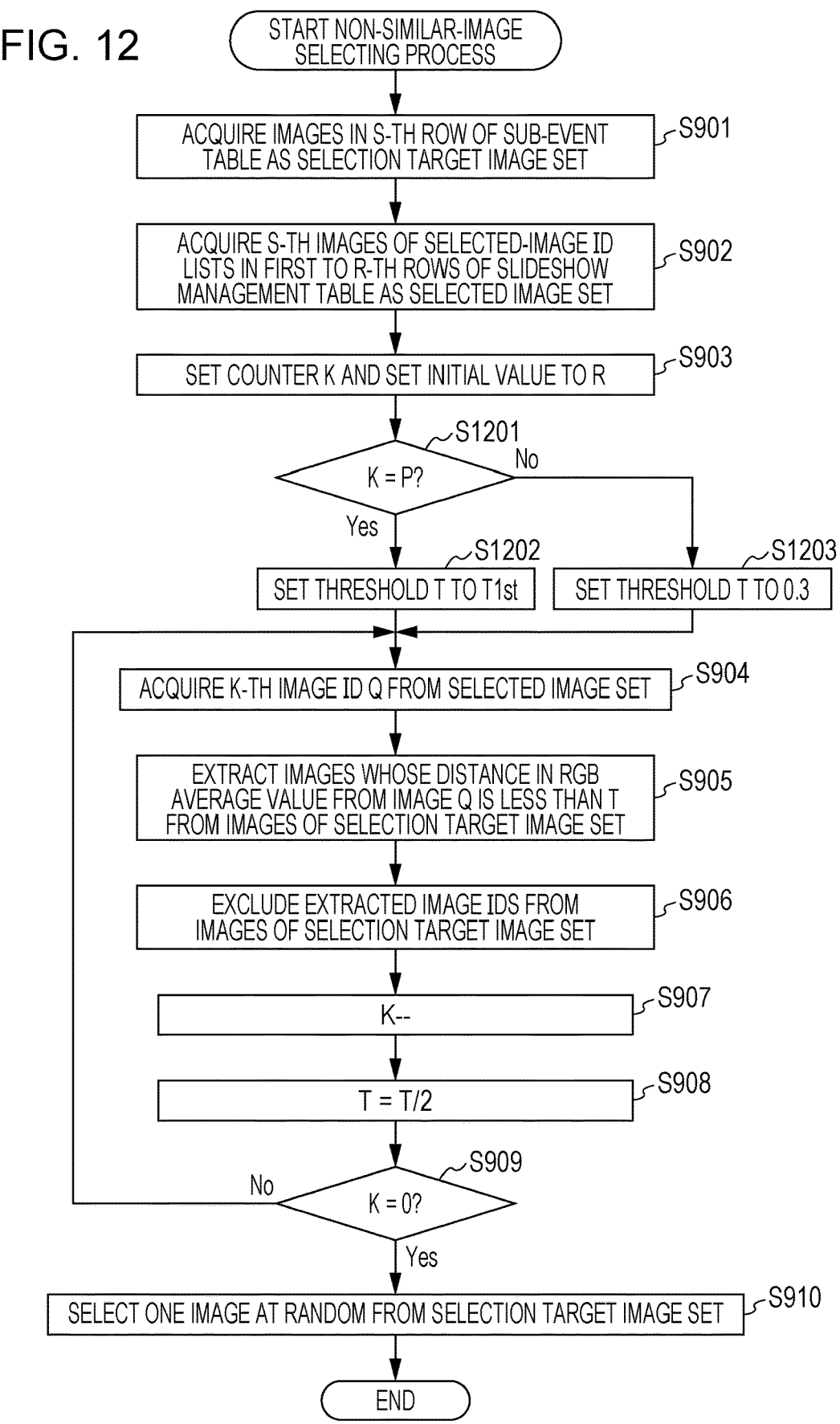
FIG. 12 is a flowchart illustrating an operation for selecting an image according to a fourth embodiment of the present disclosure.

This concludes the description of the process for selecting non-similar images in the fourth embodiment using the flowchart in FIG. 12.

As described above, the present embodiment allows, if there is no reproducible slideshow after created slideshows are reproduced, creation of an additional slideshow. Furthermore, the time difference between the reproduction time and the present time is calculated. If the time difference is large, there is a high possibility that the viewer does not remember the content of the reproduced slideshow as compared with the case of a small time difference. For that reason, the threshold of the similarity for use in selecting images is decreased. This increases the number of selectable images.

The boundary values, one week and one month, for use in setting the initial threshold T1st in the flowchart in FIG. 12 are illustrative only, and any other value may be used. It is only required that the initial threshold T1st is smaller as the time difference increases. Likewise, the value of the threshold T1st is also illustrative only, and any other values may be used. It is only required that the value of the initial threshold T1st is smaller as the time difference increases.

In the case where the time difference is large, for example, one year or longer, the viewer can forget the content of the reproduced slideshow. For that reason, the initial threshold T1st may be set to 0. The selection image management table 501 may be initialized, and slideshows may be created using one of the methods of the first to third embodiments.

Fifth Embodiment

Figure 13:
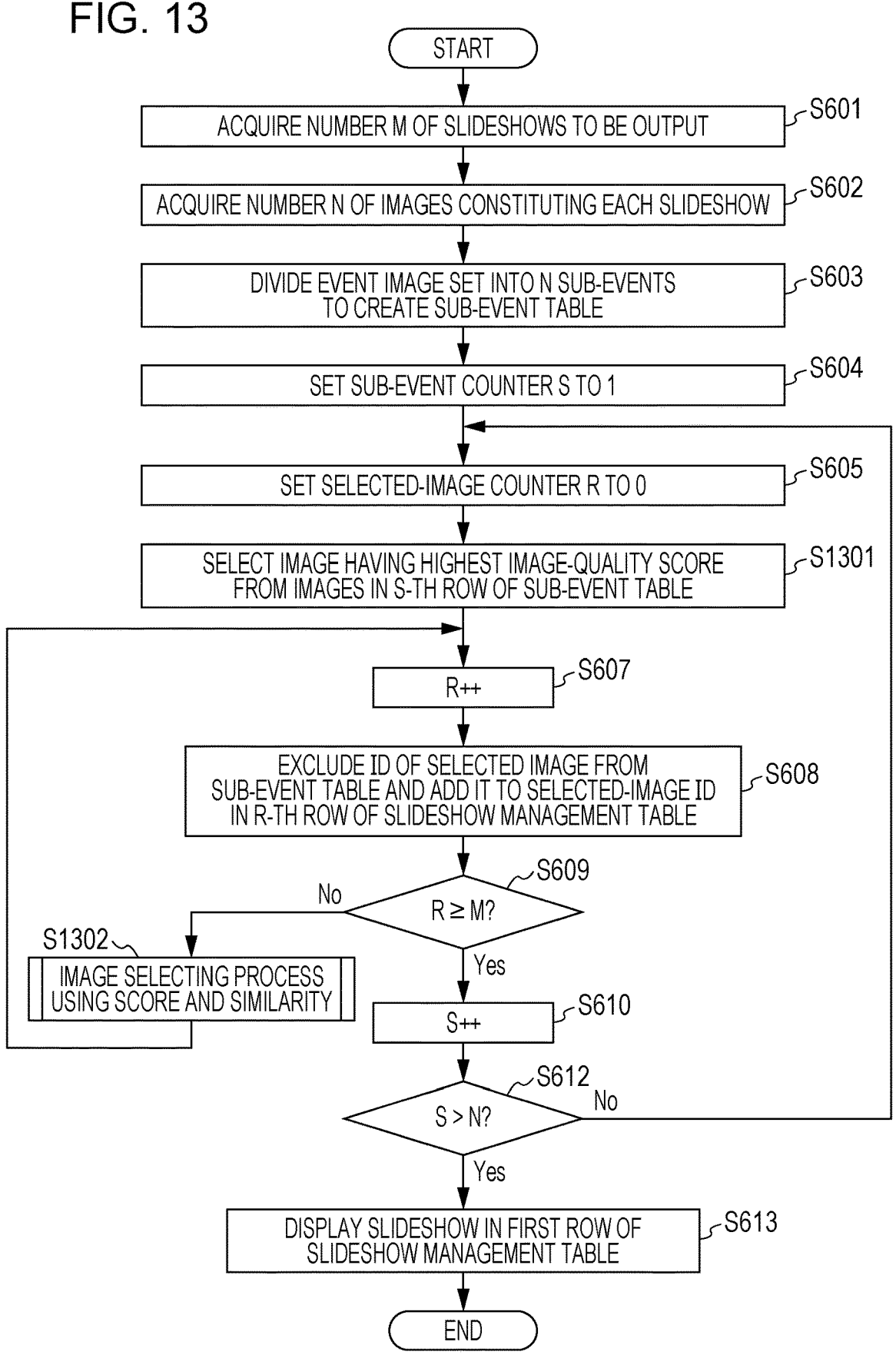
FIG. 13 is a flowchart illustrating an operation for creating a slideshow according to a fifth embodiment of the present disclosure.
Figure 14:
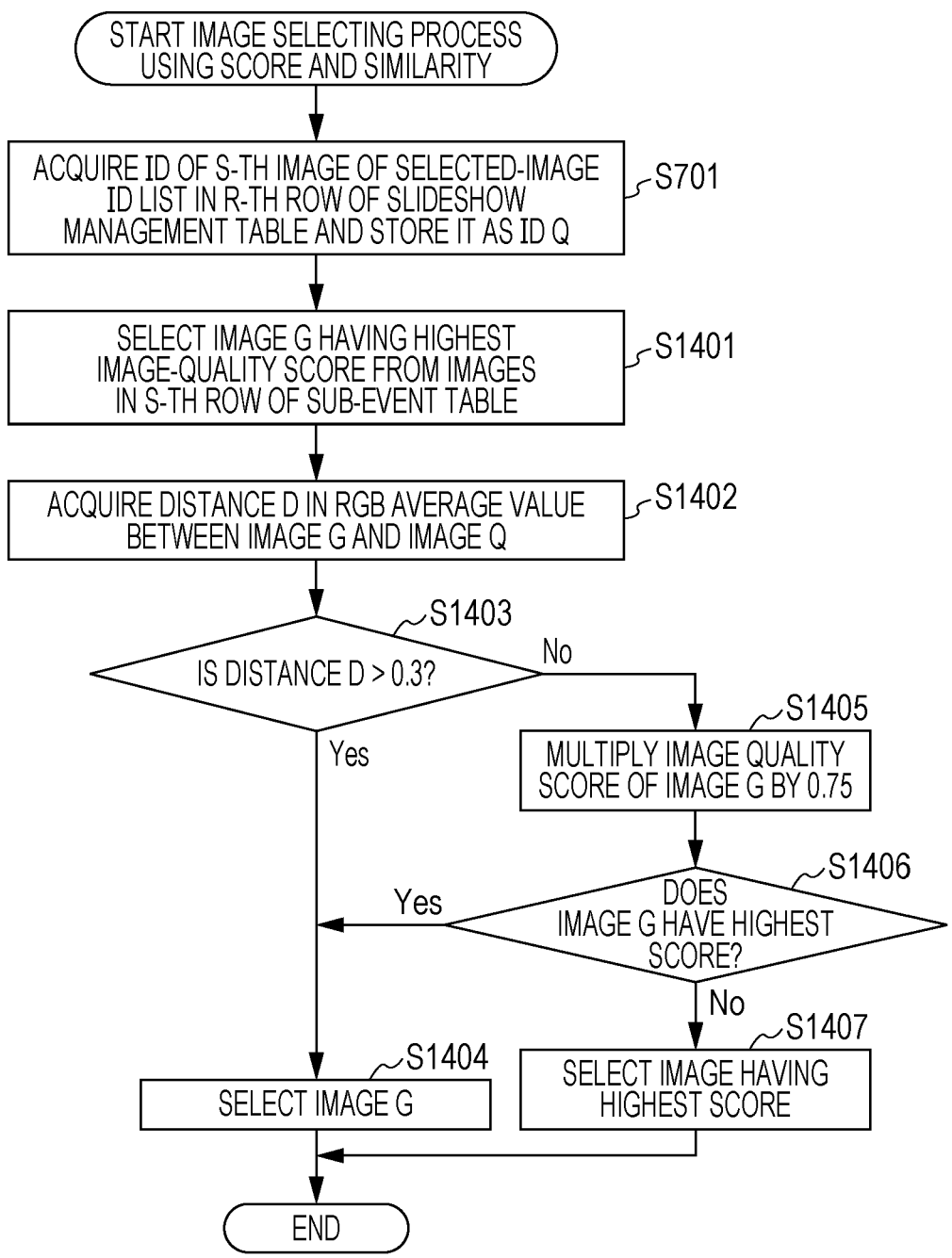
FIG. 14 is a flowchart illustrating an operation for selecting an image according to a fifth embodiment of the present disclosure.

In the first to fourth embodiments, images with high similarity are not selected across slideshows to be created. However, for images with low similarity, images with low image quality scores may be selected. To cope with this issue, the present embodiment selects images in descending order of image quality scores. Difference from the first embodiment will be described hereinbelow with reference to flowcharts in FIGS. 13 and 14. The flowchart in FIG. 13 is a replacement of the flowchart in FIG. 6 of the first embodiment. The flowchart in FIG. 14 is a replacement of the flowchart in FIG. 7 of the first embodiment.

A process for selecting images on the basis of image quality scores to create a slideshow will be described with reference to the flowchart in FIG. 13.

At S1301, the image selecting unit 203 acquires scores of images in the elements of the S-th row of the sub-event table 401 from the image management table 501 and selects an image with the highest score.

Step S1302 is a process of selecting images using scores and similarities performed by the image selecting unit 203. The details of the process will be described later with reference to the flowchart in FIG. 14.

This concludes the process of creating a slideshow using the flowchart in FIG. 13.

Referring next to the flowchart in FIG. 14, the process for selecting images using scores and similarities (S1302) will be described.

At S1401, the image selecting unit 203 acquires the image ID of an image G with a highest score from the images included in the constituent image ID list in the S-th row of the sub-event table 401.

At S1402, the image selecting unit 203 calculates a distance D using the RGB average values of the image G and the image Q.

At S1403, the image selecting unit 203 determines whether the distance D is larger than 0.3, and if the distance D is larger than 0.3 (Yes at S1403), the process goes to S1404, and if the distance D is equal to or less than 0.3 (No at S1403), the process goes to S1405.

At S1404, the image selecting unit 203 selects the image G.

At S1405, the image selecting unit 203 multiplies the score of the image G by 0.75 to impose penalty on the score of the image G.

At S1406, the image selecting unit 203 determines whether the score of the image G after being changed is highest in the selected-image set, and if the score is the highest score (Yes at S1406), the process goes to S1404, and if not (No at S1406), the process goes to S1407.

At S1407, the image selecting unit 203 selects an image with the highest score in the selected-image set.

This concludes the description of the process for selecting images using image quality and similarity using FIG. 14.

As described above, the present embodiment allows a plurality of slideshows with different impressions to be created while keeping the quality of the images by selecting images in descending order of image quality scores and imposing penalty on the scores of images similar to the selected images.

The value of the penalty on the score imposed at S1405 is illustrative only, and any other values may be used because the distribution of the scores differs depending on how the scores are calculated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-247182 filed Dec. 20, 2016, which is hereby incorporated by reference herein in its entirety.

What is claimed is:

1. An image processing apparatus comprising:
   an extracting unit configured to extract a first sub-image set that satisfies a second condition and a second sub-image set that satisfies a third condition from an image set that satisfies a first condition;
   a similarity calculating unit configured to calculate a similarity between images in the first sub-image set and a similarity between images in the second sub-image set; and
   a selecting unit configured to select, as a first output image set, a plurality of images including a first image included in the first sub-image set and a second image included in the second sub-image set and to select, as a second output image set, a plurality of images including a third image included in the first sub-image set, the third image whose similarity to the first image being smaller than a threshold, and a fourth image included in the third sub-image set, the fourth image whose similarity to the second image being smaller than the threshold.

2. The image processing apparatus according to claim 1, wherein the extracting unit extracts a plurality of sub-image sets comprising at least the first sub-image set and the second sub-image set,
   wherein the similarity calculating unit calculates a similarity between the images included in each of the plurality of sub-image sets, and
   wherein the selecting unit selects images of the first output image set and images of the second output image set so as to select at least one image from each sub-image set based on the similarity calculated by the similarity calculating unit.

3. The image processing apparatus according to claim 2, wherein the selecting unit selects,
   based on the similarity calculated by the similarity calculating unit, an image included in the sub-image set as an image of the second output image set, the image whose similarity to an image selected as an image of the first output image set from each sub-image set being smaller than the threshold.

4. The image processing apparatus according to claim 1, wherein the conditions comprises a condition related to an image shooting time, a folder in which the image is stored, or metadata attached to the image.

5. The image processing apparatus according to claim 1, wherein the similarity calculating unit calculates the similarity between images using features of the images.

6. The image processing apparatus according to claim 1, wherein the selecting unit changes the threshold according to order of creating the output image set.

7. The image processing apparatus according to claim 1, wherein, when the sub-image set includes a small number of images, the selecting unit selects a same image for different output image sets.

8. The image processing apparatus according to claim 1, wherein, when selecting an additional output image set, the selecting unit selects images that are not similar to an image selected from a selected output image set.

9. The image processing apparatus according to claim 1, wherein, when selecting an additional output image set, the selecting unit acquires times at which a plurality of selected output image sets are output and changes the threshold depending on an interval between the output times.

10. The image processing apparatus according to claim 1, wherein the selecting unit selects, as one output image set, a same number of images as the number of the sub-image sets extracted by the extracting unit.

11. The image processing apparatus according to claim 1, wherein the selecting unit selects images for an output image set in such a manner that a similarity between images included in an output image set is smaller than the threshold.

12. The image processing apparatus according to claim 1, further comprising a display control unit configured to display images included in an output image set selected by the selecting unit on a display unit.

13. The image processing apparatus according to claim 1, wherein the selecting unit selects images in descending order of scores related to image quality, and after selecting an image, lowers the score of an image having high similarity to the selected image.

14. A method for processing images, the method comprising the steps of:
   extracting a first sub-image set that satisfies a second condition and a second sub-image set that satisfies a third condition from an image set that satisfies a first condition;
   calculating a similarity between images in the first sub-image set and a similarity between images in the second sub-image set;
   selecting, as a first output image set, a plurality of images including a first image included in the first sub-image set and a second image included in the second sub-image set; and
   selecting, as a second output image set, a plurality of images including a third image included in the first sub-image set, the third image whose similarity to the first image being smaller than a threshold, and a fourth image included in the third sub-image set, the fourth image whose similarity to the second image being smaller than the threshold.

15. A non-transitory storage medium storing a program for causing a computer to execute a method for processing images, the method comprising the steps of:
   extracting a first sub-image set that satisfies a second condition and a second sub-image set that satisfies a third condition from an image set that satisfies a first condition;
   calculating a similarity between images in the first sub-image set and a similarity between images in the second sub-image set;
   selecting, as a first output image set, a plurality of images including a first image included in the first sub-image set and a second image included in the second sub-image set; and
   selecting, as a second output image set, a plurality of images including a third image included in the first sub-image set, the third image whose similarity to the first image being smaller than a threshold, and a fourth image included in the third sub-image set, the fourth image whose similarity to the second image being smaller than the threshold.

* * * * *